(12) United States Patent
Klier

(10) Patent No.: US 7,101,086 B2
(45) Date of Patent: Sep. 5, 2006

(54) COLLAR BEARING SPLIT SHELL AND COLLAR BEARING WITH A CENTERING DEVICE, AND CORRESPONDING THRUST WASHER

(75) Inventor: Hans-Jurgen Klier, Taunusstein-Bleidenstadt (DE)

(73) Assignee: Federal-Mogul Wiesbaden GmbH & Co. KG, Wiesbaden (DE)

(*) Notice: Subject to any disclaimer, the term of this patent is extended or adjusted under 35 U.S.C. 154(b) by 97 days.

(21) Appl. No.: 10/381,712

(22) PCT Filed: Oct. 1, 2001

(86) PCT No.: PCT/DE01/03788

§ 371 (c)(1),
(2), (4) Date: Feb. 9, 2004

(87) PCT Pub. No.: WO02/29270

PCT Pub. Date: Apr. 11, 2002

(65) Prior Publication Data

US 2004/0136627 A1    Jul. 15, 2004

(30) Foreign Application Priority Data

Sep. 29, 2000  (DE) ................................ 100 48 256

(51) Int. Cl.
  *F16C 17/10* (2006.01)
(52) U.S. Cl. ........................................ 384/273; 384/294
(58) Field of Classification Search ................ 384/273, 384/288, 294, 502, 501
See application file for complete search history.

(56) References Cited

U.S. PATENT DOCUMENTS 1,644,611 A * 10/1927 Rieffert ....................... 384/501
4,533,261 A    8/1985 Losio
4,652,150 A *  3/1987 New ........................... 384/275
5,520,466 A *  5/1996 Everitt et al. ............... 384/294

FOREIGN PATENT DOCUMENTS

| DE | 24 33 929    | 2/1976  |
| DE | 87 12 192 U  | 11/1987 |
| FR | 1 161 898    | 9/1958  |
| GB | 1 574 377    | 9/1980  |

* cited by examiner

*Primary Examiner*—Lenard A. Footland
(74) *Attorney, Agent, or Firm*—Robert L. Stearns; Dickinson Wright PLLC

(57) ABSTRACT

The invention relates to a collar bearing split shell, comprising a bearing shell and two thrust washers which are located on said bearing shell. The invention also relates to a collar bearing comprising two collar bearing split shells, each of which has a bearing shell, at least one bearing shell being provided with two thrust washers located on said bearing shell. The invention also relates to a thrust washer for a collar bearing split shell. The aim of the invention is to provide a collar bearing which ensures that the two collar bearing split shells of a collar bearing are essentially flush with each other when installed. To this end, the invention provides for a collar bearing split shell on which the ends of the two thrust washers of the bearing shell extend at least partially beyond the semi-circle-shaped bearing shell in the peripheral direction; or a generic collar bearing on which the ends of the two thrust washers of at least on bearing shell extend at least partially beyond the semi-circle-shaped bearing shell in the peripheral direction. A thrust washer which is configured as a ring segment and which extends through an angle of more than 180° and a bearing shell, forming a combined collar bearing, also solve the problem addressed by the invention.

6 Claims, 2 Drawing Sheets

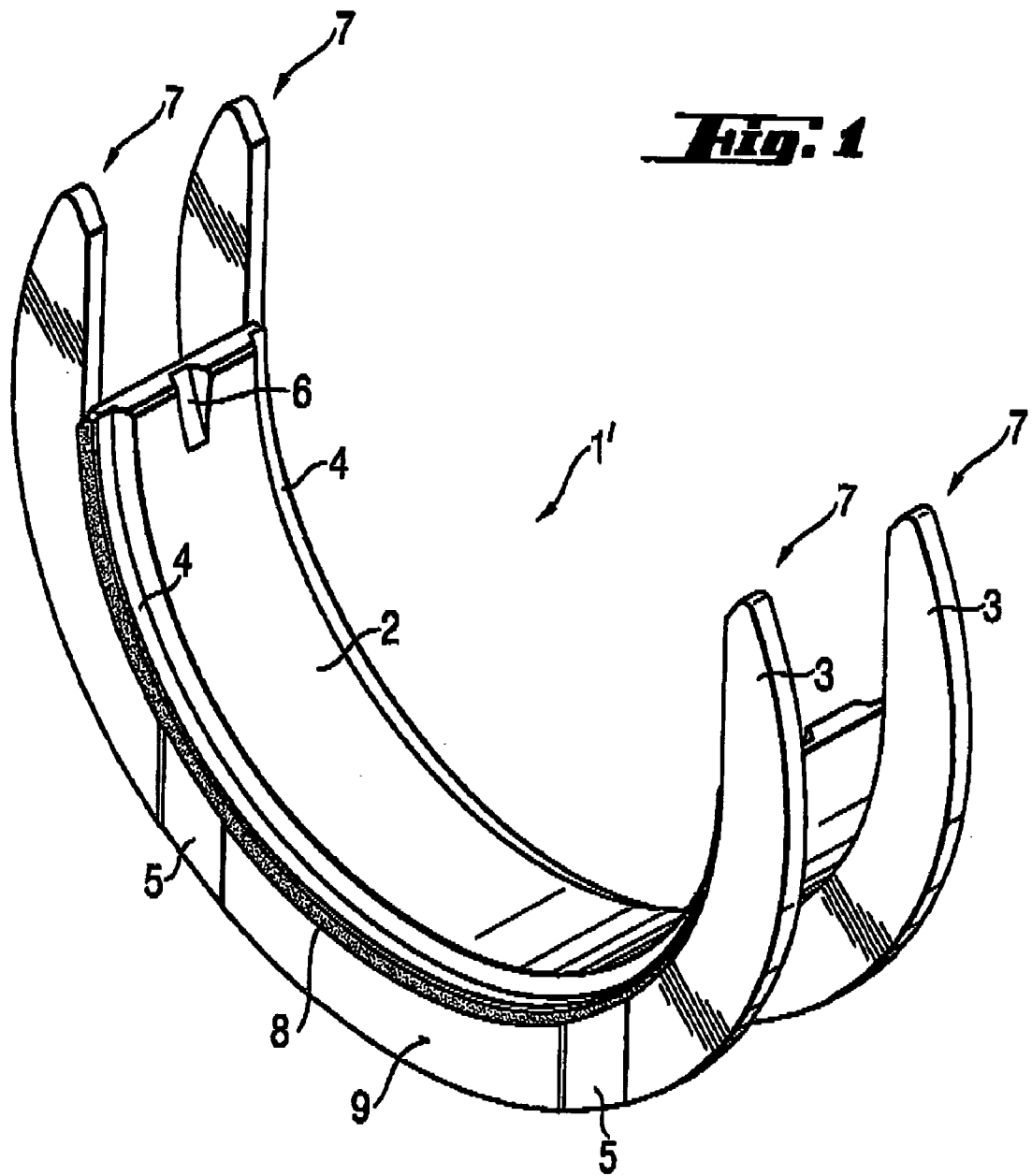

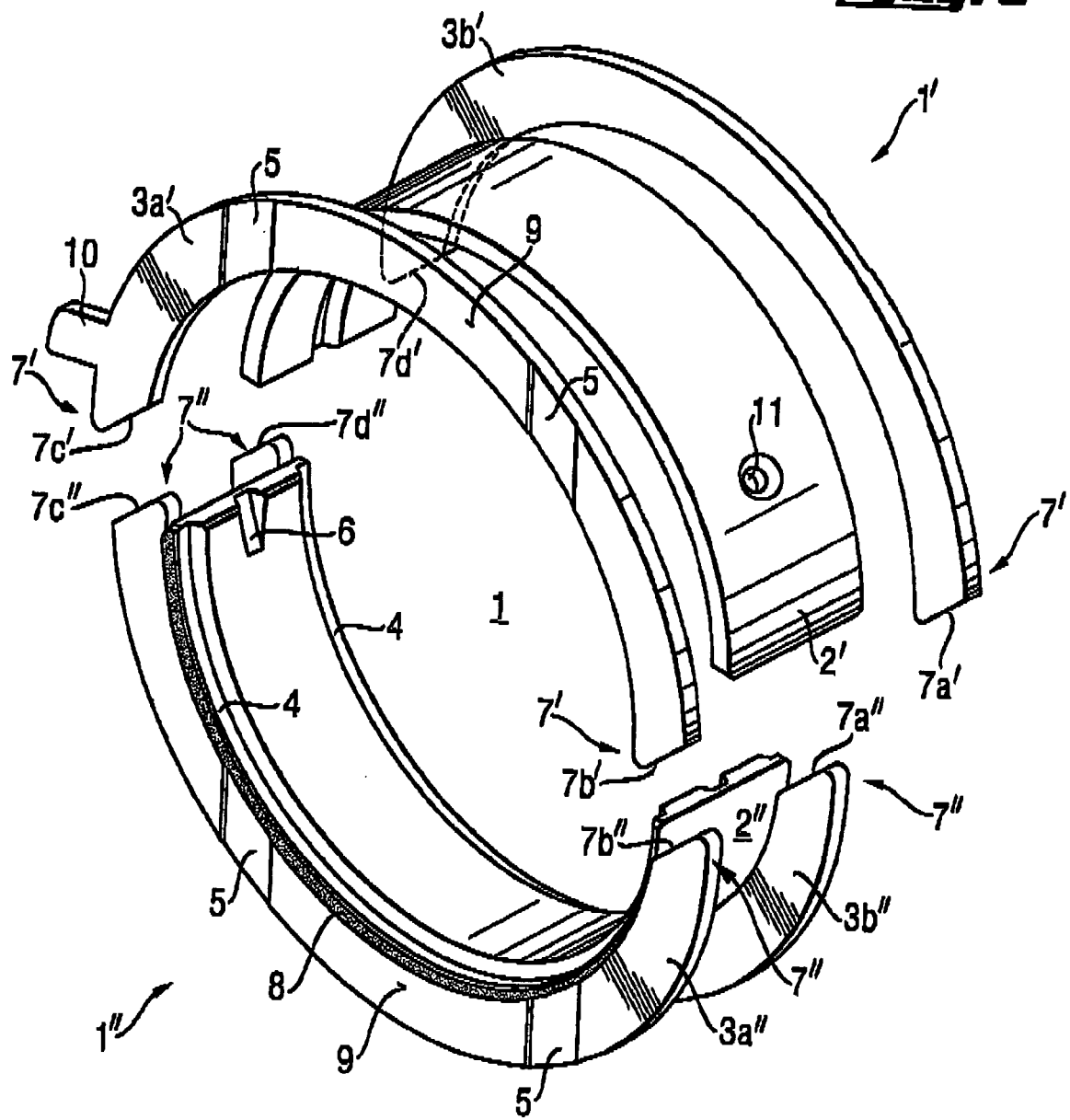

COLLAR BEARING SPLIT SHELL AND COLLAR BEARING WITH A CENTERING DEVICE, AND CORRESPONDING THRUST WASHER

BACKGROUND OF THE INVENTION

1. Technical Field

The invention relates to a flange bearing half shell having a bearing shell and two thrust washers arranged on said bearing shell.

2. Related Art

The invention also relates to a flange bearing having two flange bearing half shells, each of which comprises a bearing shell, at least one bearing shell having two thrust washers arranged on said bearing shell.

The invention also relates to a thrust washer for a flange bearing half shell, which takes the form of a ring segment.

Such flange bearings are used for example in internal combustion engines for bearing-assisted mounting of the crankshaft in the crankcase. Due to the right-angle bends in the crankshaft, the flange bearings are in principle constructed in two parts, in the form of two flange bearing half shells, with a view to facilitating mounting. Crankshafts of dismantlable modular construction are also to be found, which allow the use of one-part flange bearings, but these are still very much the exception in mass production, in particular due to the high manufacturing costs.

The bearing shell serves to absorb radial bearing forces, which are introduced via the shaft rotating in the bearing shell, whereas the thrust washer, of which there is at least one, serves to absorb axial forces. If there is a need to absorb axial forces in both directions of the shaft, two thrust washers have to be provided, since each thrust washer is only in a position to absorb the forces directed towards its overlay.

Cheeks are provided on the shaft, by means of which the shaft is supported on the thrust washer.

As a rule, the crankshaft bearing arrangement comprises a plurality of radial plain bearings, i.e. a plurality of bearings without thrust washers, and one combined radial/axial plain bearing. This radial/axial plain bearing has the thrust washers necessary for absorbing axial forces. Reference is made below to the combined radial/axial plain bearing, since it is this plain bearing construction which substantially constitutes the subject matter of the invention.

The flange bearings conventionally constructed in two parts in the form of two flange bearing half shells are preliminarily mounted in such a way in the crankcase that, prior to insertion of the crankshaft, the upper flange bearing half shell is positioned in the upper half of the crankcase and the lower flange bearing half shell is positioned in the lower half, or "cover", of the crankcase.

The upper half of the crankcase is the part of the crankcase which is connected with the engine block, i.e. the part of the crankcase which is arranged between the crankshaft and the cylinder head. The upper case half is, as indeed is the entire crankcase, essentially a casting, which is post-machined and comprises a bearing saddle for accommodating the upper flange bearing half shell, onto which the upper flange bearing half shell is fitted during mounting.

As a rule, the upper flange bearing half shell has a hole, through which the plain bearing is supplied with oil. The oil itself is fed as far as into the bearing saddles of the crankcase by means of feed lines. Consequently, care must be taken when fitting the upper flange bearing half shell to ensure that the oil supply hole in the bearing shell is aligned with the outlet of the oil supply line in the bearing saddle. A central and thus symmetrical arrangement of the hole is not expedient, since the supply hole has as a rule to be arranged eccentrically due to pressure distribution in the plain bearing lubricating oil film. Incorrect positioning of the upper flange bearing half shell in the bearing saddle and thus closure of the oil supply line results in inadequate oil supply to the plain bearing and, in the worst case scenario, to dry running of the bearing and bearing destruction.

For this reason, mounting aids are provided to assist in mounting. It is usual in practice to arrange a lug-type, outwardly projecting cam on the outer circumferential surface of the bearing shell, wherein a recess corresponding to said cam is provided in the bearing saddle of the crankcase. The flange bearing half shell, with its outwardly projecting cam, can then only be properly mounted in the bearing block when cam and recess fit together, i.e. the oil supply hole of the bearing shell is aligned with the outlet opening of the oil supply line in the bearing saddle and the flange bearing half shell is correctly oriented.

Constructing the mounting aid as a cam and corresponding recess is complex, due to the manufacturing process which has to be carried out, and requires a plurality of operations. The outwardly projecting cam is generated by a stamping process. The plain bearing material which is detached from the bearing shell in the process has to be carefully removed, so that loose particles do not become the cause of bearing fretting after mounting and during operation of the internal combustion engine.

Apart from the absent oil supply hole, the lower flange bearing half shell is of the same construction as the upper flange bearing half shell. It too has a cam as mounting aid.

The lower half shell of the flange bearing is arranged in the crankcase cover. To this end, the bearing cover is provided in the case cover to accommodate the lower flange bearing half shell. Together with the bearing saddle arranged in the upper case part, the bearing cover forms the receptacle for the flanged bearing, wherein the bearing saddle accommodates the upper flanged bearing half shell and the bearing cover the lower flanged bearing half shell.

After preliminary mounting, i.e. fitting the two flange bearing half shells into the upper case part and the case cover respectively and carrying out the remaining preliminary operations, the upper case part is fitted together with the case cover and screwed thereto, so as thus to form a closed crankcase.

The two crankcase parts do not as a rule have any centering devices which fixedly determine the relative position of these two components to one another. The screw connections provided in the crankcase, which connect the case cover firmly to the upper case part, by their nature exhibit a clearance and cannot for this reason serve as centering devices, such that the case cover may be moved, in particular by up to a few tenths of a millimeter in the direction of the crankshaft axis, relative to the upper case part once the screws have been screwed in but not tightened.

The two-part crankcase consisting of the upper case part and the case cover is generally divided along a straight line, i.e. the bearing cover and the bearing saddle, which together form the receptacle for the flange bearing, each have a semicircular recess extending over an angle of 180°, into which the flange baring half shells may be inserted. These flange bearing half shells are likewise generally divided along a straight line and extend over an angle of 180°.

If, as already explained, the case cover is displaceable and uncentered relative to the upper case part in the direction of the crankshaft axis due to the lack of a centering device, the lower flange bearing half shell may also be displaced relative to the upper flange bearing half shell. Neither of the two flange bearing half shells is purposefully oriented and fixed with regard to the flange baring half shell opposite it.

If the two flange bearing half shells are axially offset, the two thrust washers arranged to the left of the bearing bore or to the right of the bearing bore do not lie in a plane, such that on the one hand the bearing absorbs forces or fulfills its task of providing axial guidance and support for the crankshaft only on the thrust washer which protrudes further axially. On the other hand, overloading of the only partially stressed bearing may occur.

Against this background, it is the object of the present invention to provide a measure which ensures that the two flange bearing half shells of a flange bearing are aligned with one another when fitted and to provide a device with which the crankcase cover is centered in the upper part of the crankcase.

SUMMARY OF THE INVENTION

This object is achieved by a flange bearing half shell having a bearing shell and two thrust washers arranged on said bearing shell, the ends of the two thrust washers of the bearing shell extending circumferentially at least in part beyond the semicircular bearing shell.

This object is also achieved by a flange bearing having two flange bearing half shells, of which each comprises a bearing shell and at least one baring shell has two thrust washers arranged on said bearing shell, the flange bearing being characterized in that the ends of the two thrust washers of at least one bearing shell extend circumferentially at least in part beyond the semicircular bearing shell.

Embodiments which are favored are those in which the thrust washers are welded to the bearing shell.

Because the ends of the thrust washers of at least one bearing shell extend circumferentially beyond the semicircular bearing shell, a flange bearing half shell arranged in one crankcase part engages with its thrust washers in the opposing crankcase part.

For example, a flange baring half shell arranged in the upper case part engages with its thrust washers, formed according to the invention, in the manner of fingers in the case cover. In this way, the flange bearing half shell itself is virtually fixed in the axial direction by the bearing saddle arranged in the upper case part, wherein a clearance fit is selected as a rule for the bearing half shell/bearing saddle combination, in such a way that the baring saddle accommodated between the thrust washers of the bearing half shell may still be moved manually, i.e. a clearance is present between the bearing saddle and the thrust washers accommodating it of for example 20 µm to 50 µm.

The ends of the thrust washers formed according to the invention of said flange bearing half shell accommodated by the bearing saddle engage in the case cover and fix the bearing cover arranged in the case cover between them. In this way, the cover of the crankcase, connected rigidly with the bearing cover, is likewise fixed. The neighboring ends of the opposing thrust washers engage in each case to the right and left of the actual bearing bore or of the crankshaft axis in the manner of a fork in the bearing block or bearing cover and thus fix the bearing block or a wall belonging to the bearing block.

The bearing cover exhibits, with regard to the two thrust washers arranged to the right and left thereof, a manufacturing tolerance which results in a clearance fit for the bearing half shell/bearing saddle combination, as already explained with reference to the bearing saddle. Between the bearing cover and the thrust washers bounding it to the right and left, a slight clearance is established, for example, which is of the order of from 20 µm to 50 µm, for example.

Due to the flange bearing according to the invention, in which the ends of the two thrust washers of a least one bearing shell extend circumferentially at least in part beyond the semicircular bearing shell, sufficiently precise centering of the case cover on the upper part of the crankcase is achieved with simple means, wherein a tolerance is achieved with amounts, in the above-mentioned numerical example, to from 20 µm to 50 µm for example, i.e. the case cover is fixed on the upper case part with a maximum axial deviation of 50 µm form a predetermined nominal position.

The explanations given for the upper flange bearing half shell apply in the same way to the lower flange bearing half shell, wherein this bearing half shell is then seated in the lower case part and fixes the bearing saddles between its thrust washers in the manner of a fork and thus centers the upper case part relative to the lower case part.

The flange bearing according to the invention renders it unnecessary to provide additional means forming a centering device, but instead used components already present for this purpose, by further developing in accordance with the invention a thrust washer known per se. Thus, there are no additional parts to be mounted during mounting and in principle no additional parts have to be held in stock during manufacture, such that production, in particular mounting, becomes neither more complex nor more cost-intensive while at the same time the quality of the internal combustion engine produced is improved.

The flange bearing according to the invention on the one hand allows centering of the case cover on the upper case part. On the other hand, it is ensured that the two bearing half shells are aligned with one another when fitted.

The disadvantages known from the prior art, which appear when a centering device for the two crankcase parts is absent, may be eliminated or reduced. The thrust washers of the mutually opposing bearing shells are each aligned with one another, i.e. the two thrust washers arranged axially to the right of the flange bearing and to the left of the flange bearing respectively lie with their running surfaces approximately in a plane.

Flange bearings are advantageous, in which only the ends of the two thrust washers of one bearing shell extend circumferentially at least in part beyond the semicircular bearing shell.

An advantage of this embodiment of the flange bearing is that centering of the two crankcase parts is effected by only one bearing shell, such that the second bearing shell, which is opposite the centering bearing shell, does not have to be constructed with regard to the object to be achieved, i.e. with regard to centering.

Consequently, the second bearing shell may be a bearing shell according to the prior art, provided it is constructed in such a way that, together with the flange bearing half shell constructed according to the invention, it may form a flange bearing. In particular, it is possible to provide a bearing shell without thrust washers as a second bearing shell. The thrust washers of the centering bearing shell preferably extend as far as possible in the circumferential direction, in order to produce the largest possible sliding surface for the axial plain bearing. The only limit thereto is that the crankshaft has still to be incorporated or inserted, as a function of its crankshaft diameter, into the centering bearing shell thus constructed.

Embodiments of the flange bearing are also advantageous, in which the ends of the two thrust washers of both bearing shells extend circumferentially at least in part beyond the semicircular bearing shell.

An advantage of this embodiment is that the thrust washers of both bearing shells then form the centering device and together center the crankcase upper part and cover. In this way, it is possible to provide a sliding surface for the axial plain bearing which is virtually continuous over 360°. The thus maximized running surface of the axial plain bearing then leads, given equal axial loading, to lower specific surface pressure.

This embodiment has the additional advantage that the axial forces which may be exerted on the centering device by the assembled crankcase parts are distributed over more thrust washers.

Embodiments of the flange bearing are advantageous in which at least a first end of a thrust washer of a first bearing shell comprises first mounting aids and a second end of a thrust washer of a second bearing shell, which is opposite and in engagement with the first end when the flange bearing is assembled, has mounting aids complementary to the first mounting aids, in such a manner that the flange bearing can only be assembled if the flange baring half shells are oriented as required for fitting.

A favorable feature of this embodiment is that, by means of mounting means provided, which are components of the flange bearing half shells themselves, it may be clearly determined whether the two bearing shells are correctly positioned relative to one another. Consequently, proper mounting of one bearing half shell is sufficient, wherein this mounted baring half shell creates a framework for mounting of the second bearing half shell still to be mounted, i.e. the two bearing half shells can only be assembled in a given arrangement due to the mounting aids provided.

Consequently, it is possible to omit provision on the second bearing half shell of aids which serve, independently of the first bearing half shell, as an indicator for the correct positioning of the second bearing half shell. It is a widespread practice, as already stated with reference to the prior art, to provide an outwardly projecting cam, which is arranged on the outer circumferential surface of the bearing half shell and engages in the mounted state in a recess in the bearing bore corresponding to the cam.

Provision of such a cam on the second bearing shell is no longer necessary due to the integral mounting aids, thereby reducing costs in particular.

Embodiments of the flange bearing are advantageous in which the mounting aids take the form of bevels. These mounting aids may be simply produced, beveling of the ends of the thrust washers sometimes being effected even in the case of flange bearings according to the prior art, but without constructing and using the bevels as mounting aids for the purposes of the present invention.

Embodiments of the flange bearing are advantageous in which the bevels are formed in such a manner that the internal radius or external radius of the thrust washer changes continuously in the circumferential direction. In this case, the thrust washer tapers towards its end, the thickness of the thrust washer preferably remaining the same.

Embodiments of the flange bearing are advantageous in which the bevels are formed in such a manner that the thickness of the thrust washer changes continuously in the circumferential direction towards the end of the thrust washer. Then, both the inner surface of the thrust washer may remain unchanged and the thickness start to reduce at the outer surface, and the outer surface of the thrust washer may remain unchanged and the thickness start to reduce at the inner surface.

Embodiments of the flange bearing are advantageous, in which the mounting aids are identical on one side of each bearing shell and differ from the mounting aids on the other side of said bearing shell. This measure ensures that a bearing shell rotated by 180° from the mounting position cannot be joined to the opposing, correctly oriented bearing shell.

Embodiments of the flange bearing are favorable in which at least one thrust washer has an outwardly projecting lug located in the plane of the thrust washer.

One of the two flange bearing half shells is preferably provided with an aid which ensures correct orientation of said bearing shell upon fitting. In contrast to the bearing shells according to the prior art, which conventionally provide a cam on the bearing shell and a recess in the bearing bore, which engage in one another in the assembled state, in the case of the flange bearing according to the invention a fitting aid is provided in the form of an outwardly projecting lug arranged on a thrust washer.

To accommodate this lug, a recess for accommodating this lug is preferably included as early as in the structural design of the crankcase, such that this recess is generally already a component of the case crankcase.

Embodiments of the flange bearing are advantageous in which the thrust washer, of which there is at least one, comprises grooves at its outer surface, which grooves intersect with the outer surface in the manner of a secant. These grooves are necessary to form a load-bearing lubricant film on the thrust washer and to remove oil.

The scope of protection of the present invention also covers a thrust washer for a flange bearing half shell which takes the form of a ring segment and is characterized in that it extends over an angle of more than 180°. Together with a corresponding bearing shell, a pair of such thrust washers achieves, as a combined flange bearing, the object forming the basis of the invention. The particular structural configuration of the thrust washer according to the invention should be deemed the nub of the present invention.

Embodiments of the thrust washer are advantageous which have an outwardly projecting lug located in the plane of the thrust washer.

THE DRAWINGS

The invention is explained more fully below with reference to two exemplary embodiments according to FIGS. 1 and 2, in which:

FIG. 1 is a perspective representation of a first embodiment of a flange bearing half shell, and FIG. 2 is a perspective representation of a second embodiment of a flange bearing with the two flange bearing half shells forming the flange bearing.

DETAILED DESCRIPTION

FIG. 1 is a perspective representation of a first embodiment of a flange baring half shell 1'. The flange bearing half shell 1' has a bearing shell 2 and two thrust washers 3 arranged on said bearing shell 2. The thrust washers 3 are welded to the outer circumferential surface of the bearing shell 2 in such a manner that the thrust washers 3 are ideally perpendicular to the axis of the flange bearing or perpendicular to the axis of the crankshaft to be borne by the flange bearing. The thrust washers 3 are arranged at the edges or end faces of the bearing shell 2. Clearly recognizable is the weld seam 8, by means of which the front thrust washer 3 is connected with the bearing shell 2.

The four ends 7 of the two thrust washers 3 extend circumferentially beyond the semicircular bearing shell 2. The neighboring ends 7 of the opposing thrust washers 3 each form a type of fork. If the flange bearing half shell 1' illustrated in FIG. 1. which does not comprise an oil supply hole and is provided for arrangement in the cover of the crankcase, is then mounted in a bearing cover arranged in the case cover, the ends 7 of the thrust washers 3 engage in the upper part of the crankcase when the crankcase is in the assembled state. The fork-like ends 7 of the thrust washers 3 then engage in the bearing saddle, on which the opposing flange bearing half shell 1" (not shown) is placed, wherein the bearing saddle or a wall belonging to the bearing saddle is fixed between the thrust washers 3, thereby achieving centering of the two crankcase parts relative to one another.

A flange bearing using the flange bearing half shell 1' illustrated in FIG. 1 effects centering of the two crankcase parts with only one flange bearing half shell 1', namely the one illustrated. A second bearing shell, lying opposite the centering flange bearing half shell 1', may be a bearing shell constructed according to the prior art, provided that it is so constructed that it may form a flange bearing together with the flange bearing half shell 1' constructed according to the invention. In particular, it is possible to provide a bearing shell without thrust washers as a second bearing shell, since the flange bearing half shell 1' illustrated has large-area thrust washers 3. These thrust washers 3 form an outer surface 9, which by itself forms a sufficiently large plain bearing surface without the addition of a further thrust washer of a second bearing shell. The outer surfaces 9 of the thrust washers 3 have two grooves 5, which intersect with the outer surfaces 9 in the manner of a secant. These grooves 5 are necessary to build up a sufficiently load-bearing lubricant film in the axial plain bearing and to remove oil.

The flange bearing half shell 1' shown in FIG. 1 additionally has a groove 6 arranged in the running surface of the bearing shell 2. This groove 6 extends circumferentially, i.e. in the direction of rotation of the crankshaft, and serves as an oil reservoir for accommodating lubricating oil.

Furthermore, the bearing shell 2 comprises at its edges circumferentially extending grooves 4, which increase the flexibility of the bearing shell 2 and thus of the entire flange bearing half shell 1'.

FIG. 2 shows an embodiment of the flange bearing 1 in which the two bearing shells 2', 2" each have two thrust washers 3a', 3b', 3a", 3b".

The upper flange bearing half shell 1' is illustrated in exploded perspective view, with thrust washers 3a', 3b' not attached to the bearing shell 2'. The lower flange bearing half shell 1" is illustrated in the assembled state as a finished component.

This lower flange bearing half shell 1" is very similar to the flange bearing half shell illustrated in FIG. 1. Its thrust washers 3a", 3b" are arranged on the outer circumferential surface of the bearing shell and connected undetachably via a weld seam 8 to the bearing shell 2". Again, they are perpendicular to the flange bearing axis and are arranged at the end faces of the bearing shell 2".

The ends 7" of the thrust washers 3a", 3b" extend circumferentially, but only in part beyond the semicircular bearing shell. In addition, the ends 7" of these two thrust washers 3a", 3b" comprise mounting aids 7a", 7b", 7c", 7c" in the form of beveled ends 7" of the thrust washers 3a", 3b".

In the embodiment of the flange bearing 1 illustrated in FIG. 2, the upper flange bearing half shell 1' is constructed like the lower flange bearing half shell 1" except for two structural elements.

One further structural element, which the upper flange bearing half shell 1" comprises in contrast to the lower flange bearing half shell 1", is the oil supply hole 11 arranged eccentrically in the bearing shell 2', via which hole 11 the flange bearing 1 is supplied with lubricating oil. The oil supply hole 11 has to be aligned with the outlet of the oil supply line in the bearing bore, such that the upper flange bearing half shell 1' cannot be mounted in just any way on the bearing saddle arranged in the upper crankcase part.

An outwardly projecting lug 10 located in the plane of the thrust washer is arranged on the front thrust washer 3a' as a mounting aid for mounting the upper flange bearing half shell 1'. When the flange bearing half shell 1' is correctly positioned, this lug 10 engages in a recess corresponding thereto, which is to be provided on the bearing receptacle or the bearing saddle in the crankcase. This lug ensures that the upper flange bearing half shell 1' can only be mounted in a predetermined position.

The ends 7' of the thrust washers 3a', 3b' of the upper flange bearing half shell 1' comprise first mounting aids 7a', 7b', 7c', 7d', which engage, when the flange bearing 1 is assembled, with the mounting aids 7a", 7b", 7c", 7d" arranged at the ends 7" of the thrust washers 3a", 3b" of the lower flange bearing half shell 1'.

The mounting aids 7a', 7b', 7c', 7d' of the upper bearing half shell 1' likewise take the form of bevels. As in the case of the lower flange bearing half shell 1", the bevels on one side of the bearing shell 2', 2" are oriented in the same way, i.e. identically, and differently from the bevels on the other side of said bearing shell 2', 2".

The bevels are formed in such a manner that the internal radius or external radius of the thrust washer 3a', 3b', 3a", 3b" changes continuously in the circumferential direction. The thrust washers 3a', 3b', 3a", 3b" taper towards their ends 7', 7", wherein the thickness of the thrust washers 3a', 3b', 3a", 3b" preferably remains the same.

The upper flange bearing half shell 1' inserted into the upper half of the crankcase creates a framework, so to speak, for fitting of the lower flange bearing half shell 1". According to the invention, the two flange bearing half shells 1', 1" may only be assembled into a flange bearing 1 if the flange bearing half shells 1', 1" are oriented correctly for fitting. Then, the first mounting aids 7a', 7b', 7c', 7d' of the upper flange bearing half shell 1' cooperate with the second mounting aids 7a", 7b", 7c", 7d" of the lower flange bearing half shell 1" in accordance with the "key and lock" principle. Since the mounting position of the lower flange bearing half shell 1" is predetermined by the opposing upper flange bearing half shell 1', a further mounting aid in the form of a lug or a cam to be arranged on the bearing shell may be dispensed with.

The thrust washers 3a', 3b', 3a", 3b" each have two grooves 5 in their outer surfaces 9, which grooves 5 are required to form a load-bearing lubricant film.

In the case of the flange bearing 1 illustrated in FIG. 2, centering of the two crankcase parts relative to one another is effected via two flange bearing half shells 1', 1". With the ends 7' of the two thrust washers 3a', 3b', which extend circumferentially at least in part beyond the semicircular bearing shell 2', the upper flange bearing half shell 1' arranged in the upper case part centers the case cover relative to the upper crankcase part.

On the other hand, the lower flange bearing half shell 1″ arranged in the case cover uses the ends 7″ of its two thrust washers 3a″, 3b″, which extend circumferentially at least in part beyond the semicircular bearing shell 2″, to center the upper case part relative to the case cover. The two flange bearing half shells 1′, 2′ jointly assume the role of a centering device.

The invention claimed is:

1. A flange bearing having two flange bearing half shells, each of which comprises a bearing shell, at least one bearing shell having two thrust washers arranged on said bearing shell, wherein the ends of the two thrust washers of at least one bearing shell extend circumferentially at least in part beyond the semicircular bearing shell, wherein the ends of the two thrust washers of both bearing shells extend circumferentially at least in part beyond the semicircular bearing shell.

2. A flange bearing according to claim 1, wherein at least a first end of a thrust washer of a first bearing shell comprises first mounting aids and a second end of a thrust washer of a second bearing shell, which is opposite and in engagement with the first end when the flange bearing is assembled, has second mounting aids complementary to the first mounting aids, in such manner that the flange bearing can only be assembled if the flange bearing half shells are oriented as required for fitting.

3. A flange bearing according to claim 2, wherein the mounting aids take the form of bevels.

4. A flange bearing according to claim 3, wherein the bevels are so constructed that the internal radius or external radius of the thrust washer changes continuously in the circumferential direction.

5. A flange bearing according to claim 2, wherein the mounting aids are identical on one side of each bearing shell and differ from the mounting aids on the other side of said bearing shell.

6. A flange bearing having two flange bearing half shells, each of which comprises a bearing shell, at least one bearing shell having two thrust washers arranged on said bearing shell, wherein the ends of the two thrust washers of at least one bearing shell extend circumferentially at least in part beyond the semicircular bearing shell, wherein the ends of the two thrust washers of both bearing shells extend circumferentially at least in part beyond the semicircular bearing shell, wherein at least one thrust washer has an outwardly projecting lug located in the plane of the thrust washer.

* * * * *

UNITED STATES PATENT AND TRADEMARK OFFICE
CERTIFICATE OF CORRECTION

PATENT NO. : 7,101,086 B2
APPLICATION NO. : 10/381712
DATED : September 5, 2006
INVENTOR(S) : Hans-Jurgen Klier It is certified that error appears in the above-identified patent and that said Letters Patent is hereby corrected as shown below:

Column 4, line 11: "with amounts" should read --which amounts--.

Column 6, line 26: "case crankcase" should read --cast crankcase--.

Column 7, line 66: "mounting aids 7a", 7b", 7c", 7c'"" should read --mounting aids 7a", 7b", 7c", 7d"--.

Column 8, line 28: "bearing half shell 1'." should read --bearing half shell 1".--

Signed and Sealed this

Fifteenth Day of May, 2007

JON W. DUDAS
*Director of the United States Patent and Trademark Office*